(12) United States Patent
Tateoka

(10) Patent No.: US 10,976,927 B2
(45) Date of Patent: Apr. 13, 2021

(54) PUSH BUTTON SHEET AND TOUCH PANEL

(71) Applicant: FANUC CORPORATION, Yamanashi (JP)

(72) Inventor: Yuuya Tateoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/727,120

(22) Filed: Dec. 26, 2019

(65) Prior Publication Data

US 2020/0210062 A1   Jul. 2, 2020

(30) Foreign Application Priority Data

Dec. 27, 2018   (JP) .............................. JP2018-245612

(51) Int. Cl.
| | | |
|---|---|---|
| *G06F 3/0488* | (2013.01) | |
| *G06F 3/044* | (2006.01) | |
| *G06F 3/0489* | (2013.01) | |
| *H01H 3/12* | (2006.01) | |

(52) U.S. Cl.
CPC .......... *G06F 3/04886* (2013.01); *G06F 3/044* (2013.01); *G06F 3/0489* (2013.01); *H01H 3/12* (2013.01); *G06F 2203/04808* (2013.01); *G06F 2203/04809* (2013.01)

(58) Field of Classification Search
CPC .... G06F 3/04886; G06F 3/0489; G06F 3/044; G06F 3/041; G06F 2203/04809; G06F 2203/04808; H01H 3/02; H01H 3/12; H01H 2203/038

USPC .................................. 345/168, 169, 173, 174
See application file for complete search history.

(56) References Cited

U.S. PATENT DOCUMENTS

| | | | | |
|---|---|---|---|---|
| 2003/0222660 | A1* | 12/2003 | Morimoto ............... | G01L 1/144 324/661 |
| 2011/0089011 | A1* | 4/2011 | Ozaki .................... | H01H 13/85 200/512 |
| 2013/0222238 | A1* | 8/2013 | Sliger ................... | G06F 3/0484 345/157 |
| 2015/0199023 | A1* | 7/2015 | Hu ........................ | G06F 3/0213 345/173 |

FOREIGN PATENT DOCUMENTS

| | | |
|---|---|---|
| JP | H09017278 A | 1/1997 |
| JP | 2011086491 A | 4/2011 |
| JP | 2012195254 A | 10/2012 |
| JP | 2017021471 A | 1/2017 |

* cited by examiner

*Primary Examiner* — Jimmy H Nguyen

(74) *Attorney, Agent, or Firm* — Hauptman Ham, LLP

(57) ABSTRACT

A push button sheet and a touch panel having the push button sheet, by which different input results can be obtained, between when an operator touches the push button sheet and when the operator presses the same button sheet. The push button sheet has at least one convex reaction area configured to be bent in a predetermined press direction, a first electrode arranged on a convex surface of the reaction area, a second electrode arranged within the reaction area and below the first electrode with respect to the press direction and electrically connected to the first electrode, and a third electrode arranged within a second reaction area, wherein the second electrode and the third electrode are electrically communicated when the reaction area is bent.

8 Claims, 7 Drawing Sheets

PUSH BUTTON SHEET AND TOUCH PANEL

RELATED APPLICATIONS

The present application claims priority of Japanese Application Number 2018-245612, filed on Dec. 27, 2018, the disclosure of which is hereby incorporated by reference herein in its entirety.

BACKGROUND OF THE INVENTION

1. Field of the Invention

The present invention relates to a push button sheet, and a touch panel having the push button sheet.

2. Description of the Related Art

In a touch panel used in a mobile terminal, etc., a dome-like convex portion may be arranged on a surface of the touch panel, in order that an operator can touch a predetermined position on the touch panel without looking at the touch panel (e.g., see JP 2011-086491 A, JP 2012-195254 A, and JP H09-017278 A).

On the other hand, it is a well-known technique to arrange an operation button outside a display (or a detection area) of a touch panel, and locate a detection electrode electrically connected to the operation button in the detection area, so that the operation of the operation button is detected as the operation of the detection electrode (e.g., see JP 2017-021471 A).

In a teaching operation of a robot, an operator often operates a teach pendant held by the operator, while looking at the robot. In such a case, the operator must recognize the position of a button on the teach pendant only by feel of a finger of the operator. Similarly to a dedicated teach pendant, etc., when the button is configured as a convex portion, the operator can recognize the position of the button only by (feel of) the finger of the operator. However, in the prior art, the button configured as the convex portion is not reacted only by being touched by the operator, and is reacted by being pushed down by the operator, in many cases.

On the other hand, when a commercially available mobile terminal (e.g., a tablet) having a plane touch panel is used as a teach pendant, the operator cannot recognize the position of the button by feel. Although a teach pendant may have a function to vibrate when the operator touches a predetermined position of the pendant, the operator cannot feel the vibration when the operator wears a glove, etc.

Otherwise, the button can be configured to be reacted when the operator merely touch the button. However, in such a case, the operator may erroneously operate the button. Although the push button sheet having the convex portion may be applied to the tablet so that the tablet is reacted by pushing the button, the sheet having the convex portion may be an obstacle in using the tablet for purpose other than the teaching, whereby it may be necessary to remove the sheet having the convex portion.

SUMMARY OF THE INVENTION

One aspect of the present disclosure is a push button sheet having at least one convex reaction area configured to be bent in a predetermined press direction, the push button sheet comprising: a first electrode arranged on a convex surface of the reaction area; a second electrode arranged in the reaction area below the first electrode with respect to the press direction, and electrically connected to the first electrode; and a third electrode arranged on a portion of the push button sheet other than the reaction area, wherein the second electrode and the third electrode are configured to be electrically communicated with each other when the reaction area is bent in the press direction.

Another aspect of the present disclosure is a touch panel having the push button sheet.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
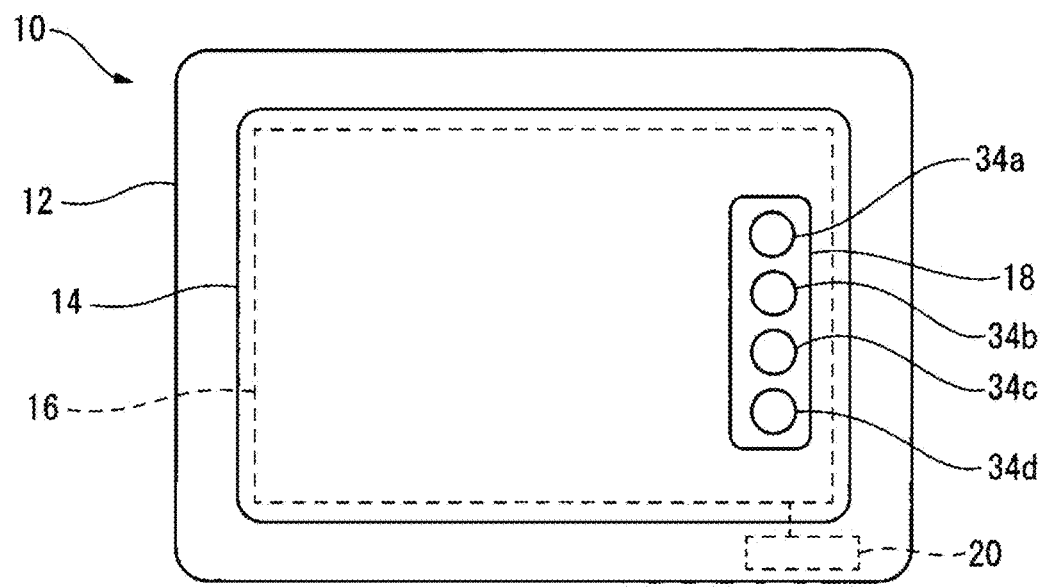
FIG. 1 is a view showing a structural example of a touch panel having a push button sheet according to the present disclosure.

FIG. 1 is a schematic view of a mobile terminal (tablet) 10 according to a preferred embodiment. Tablet 10 has a main body 12, a display section 14 such as an LCD provided to main body 12, a touch panel 16 overlapped with at least a part of display section 14, a push button sheet 18 provided to (in this case, applied to) at least a part of a surface of touch panel 16, and a control section 20 such as a processor, configured to execute various processes (e.g., displaying a predetermined image on display section 14), depending on an operation (touch or press, etc.) of an operator (user) on touch panel 16 or push button sheet 18. In this regard, the above components other than push button sheet 18 may be the same as conventional components.

Figure 2:
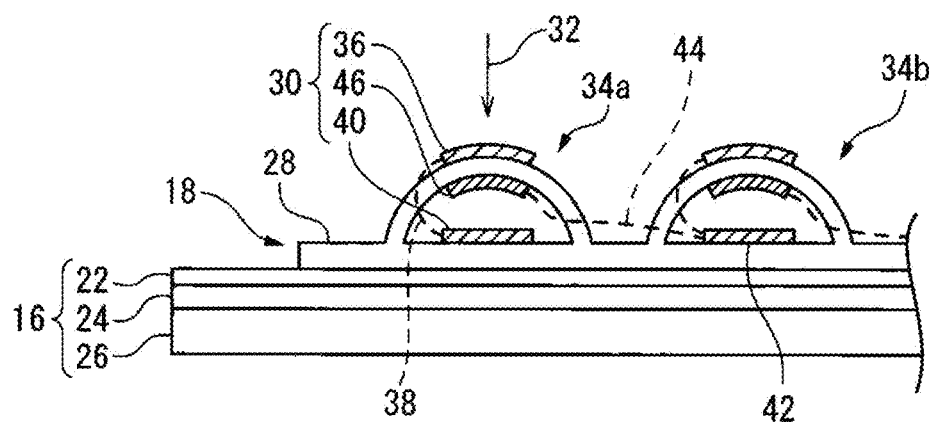
FIG. 2 is a schematic configuration view of the push button sheet.

FIG. 2 is a side cross-sectional view showing a schematic configuration of touch panel 16 and push button sheet 18 applied to touch panel 16. For example, touch panel 16 may be a surface-type or projection-type capacitive touch panel, having a laminated structure constituted by a protection cover 22, a transparent electrode membrane or electrode pattern layer 24, and a glass substrate 26. Touch panel 16 can detect where on touch panel 16 a finger of the operator touches or comes close to (i.e., a touch position), by measuring a change in a capacitance by using a sensor, etc., when the finger of the operator contacts or comes close to touch panel 16. In addition, as touch panel 16 of the embodiment, a resistive membrane type touch panel, etc., in which the operator must physically deform the surface of the touch panel (the conductive article), may be excluded.

Push button sheet 18 has: a (preferably, transparent) sheet member 28, such as soft resin, having a certain flexibility and adhesion; and a conductive member (electrode) 30, made from conductive material such as a metal, for realizing single-tap and multi-tap as described below. Sheet member 28 has at least one convex reaction area which is bendable in a predetermined press direction (in this case, a direction generally perpendicular to the sheet surface or the surface of touch panel 16) 32. As shown in FIG. 1, in this embodiment, four hollow convex portions 34a to 34d are formed as first to fourth reaction areas, respectively.

As conductive member 30, at least one of the hollow convex portions (in the drawing, hollow convex portion 34a) has: a first electrode (layer) 36 which is arranged on a convex surface (concretely, an upper surface of the convex portion) of reaction area 34a; and a second electrode (layer) 40 which is arranged within reaction area 34a and below first electrode 36 with respect to press direction 32 (concretely, a lower surface side of sheet member 28) and is electrically connected to first electrode 36 by a transparent wire or an extra-thin wire 38, etc., invisible to the naked eye. Therefore, when the finger, etc., of the operator comes into contact with or close to first electrode 36, second electrode 40 is electrically reacted (concretely, a static electricity of the surface of touch panel 16 flows to the finger of the operator via first electrode 36 and second electrode 40, or an electrostatic capacitance between touch panel 16 and second electrode 40 is changed). By virtue of this, the electrostatic capacitance of touch panel 16 is changed, and then the same effect as when the operator contacts or approaches a portion of touch panel 16 directly below reaction area 34a can be obtained. In fact, a protection sheet may be arranged on first electrode 36, such protection sheet is not shown.

Push button sheet 18 has a third electrode 42 arranged on a portion of push button sheet 18 other than reaction area 34a (in this case, inside a second reaction area 34b), and second electrode 40 and third electrode 42 are configured to be communicated with (electrically connected to) each other when the convex surface (or first electrode 36) of reaction area 34a is pressed in press direction 32. Concretely, a fourth electrode 46 is further arranged within first reaction area 34a between first electrode 36 and second electrode 40, and fourth electrode 46 is electrically connected to third electrode 42 by an extra-thin wire 44, etc. Fourth electrode 46 is configured to come into contact with second electrode 40 when reaction area 34a is pressed and bent in press direction 32. Therefore, when fourth electrode 46 contacts second electrode 40, a static electricity of the surface of touch panel 16 flows to the finger of the operator via third electrode 42 and fourth electrode 46 (or an electrostatic capacitance of the touch panel surface is changed), the same effect as when the operator contacts or approaches a portion of touch panel 16 directly below reaction area 34b can be obtained.

Figure 3:
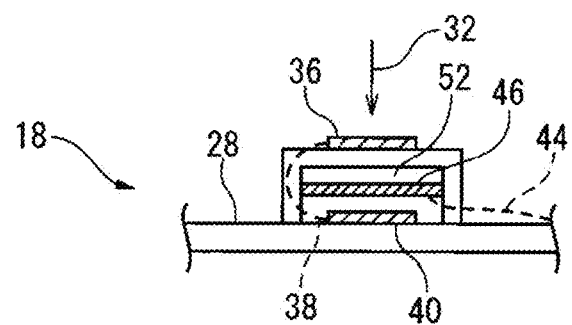
FIG. 3 is a view showing another structural example of each reaction area of the push button sheet.

In the example of FIG. 2, each reaction area (or the hollow convex portion) is formed as a semispherical (dome) shape, each of the first, second, third and fourth electrodes is constituted as a conductive layer (electrode layer), and first electrode 36 and fourth electrode 46 are formed on the outer (front) surface and the inner (back) side of the sheet member constituting the convex portion of first reaction area 34a, respectively. However, the structure of the electrodes is not limited to as such. For example, as shown in FIG. 3, each reaction area (only first reaction area 34a is illustrated in FIG. 3) may be formed as a prismatic or columnar shape bendable in press direction 32, and a peripheral edge of fourth electrode 46 may be supported by sheet member 28 within reaction area 34a.

Figure 4A:
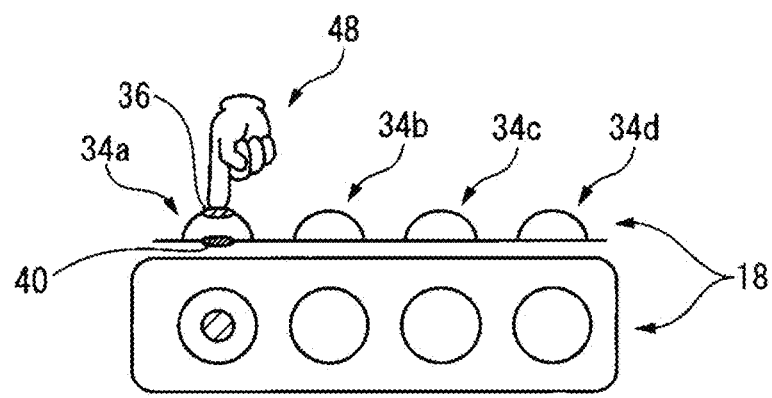
FIG. 4a is a view explaining an example of a detection result of the touch panel when an operator touches a certain reaction area of the push button sheet.
Figure 4B:
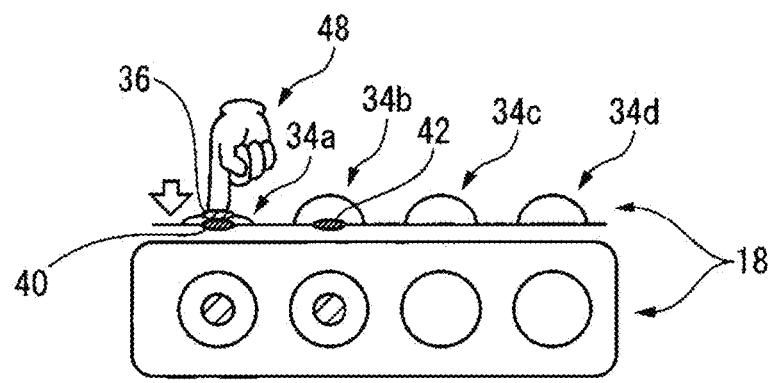
FIG. 4b is a view explaining an example of a detection result of the touch panel when the operator pushes a certain reaction area of the push button sheet.

FIG. 4a explains an example of a detection result of touch panel 16 when the operator contacts (or touches) first reaction area 34a, and FIG. 4b explains the detection result when the operator then presses first reaction area 34a. As shown in FIG. 4a, when finger 48, etc., of the operator contacts first reaction area 34a (or first electrode 36), a state, in which only one touch panel portion corresponding to first reaction area 34a is touched, is established.

Next, as shown in FIG. 4b, when finger 48, etc., of the operator presses first reaction area (hollow convex portion) 34a so that the hollow convex portion is bent, third electrode 42 within second reaction area 34b is also electrically reacted as described above, and then, a state, in which two touch panel portions respectively corresponding to first reaction area 34a and second reaction area 34b are touched, is established. As such, in the embodiment, the different touch input results can be obtained, between when the reaction area is touched and when the same reaction area is pressed.

In the present disclosure, an operation, in which only the touch panel portion corresponding to the reaction area contacted by the operator is reacted (detected as input), as when the operator touches first electrode 36 (and does not press hollow convex portion 34a by a certain volume), is referred to as "single-tap". Further, an operation, in which not only the touch panel portion corresponding to the reaction area contacted by the operator but also another touch panel portion (in this case, second reaction area 34b) are reacted, as when the operator presses hollow convex portion 34a in press direction 32 by the certain volume, is referred to as "multi-tap". Therefore, the single-tap may occur when the operator merely touches any reaction area, but the multi-tap does not occur unless the operator presses down any reaction area.

In the present disclosure, a side of the push button sheet attached to the touch panel is referred to as a "lower side (or lower surface)", and the opposite side of the push button sheet is referred to as an "upper side (or upper surface)".

Figure 5:
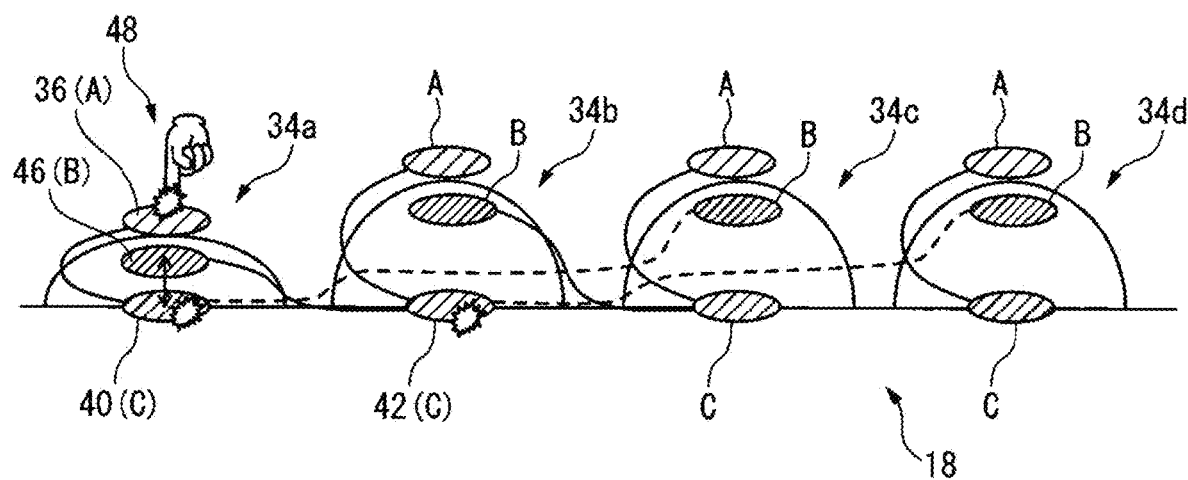
FIG. 5 is a view schematically showing a location and an electrical connecting relation of electrodes in a plurality of reaction areas.

FIG. 5 explains an application example of the above multi-tap, and concretely, schematically shows a location and an electrical connecting relation (or wiring) of the electrodes in four reaction areas 34a to 34d. In this example, first electrode 36, fourth electrode 46 and second electrode 40 may also be referred to as an A-layer, a B-layer and C-layer, respectively, and reaction areas 34a to 34d have the same electrode structure.

As explained with reference to FIG. 2, the B-layer of first reaction area 34a is electrically connected to the C-layer of second reaction area 34b. Therefore, when first reaction area 34a is pressed, the C-layer of first reaction area 34a is electrically communicated with the C-layer of second reaction area 34b, and the multi-tap as shown in FIG. 4b can be realized. Similarly, the B-layer of second reaction area 34b is electrically connected to the C-layer of third reaction area 34c. Therefore, when second reaction area 34b is pressed, the C-layer of second reaction area 34b is electrically communicated with the C-layer of third reaction area 34c, and the multi-tap can be realized.

Further, the B-layer of third reaction area 34c is electrically connected to C-layer 40 of first reaction area 34a. Therefore, when third reaction area 34c is pressed, the C-layer of third reaction area 34c is electrically communicated with the C-layer of first reaction area 34a, and the multi-tap can be realized. Moreover, the B-layer of fourth reaction area 34d is electrically connected to C-layer 42 of second reaction area 34b. Therefore, when fourth reaction area 34d is pressed, the C-layer of fourth reaction area 34d is electrically communicated with the C-layer of second reaction area 34b, and the multi-tap can be realized.

In the example of FIG. 5, when the operator merely touches a certain reaction area, only the touch panel portion corresponding to the certain reaction area is detected as a touch position (the single-tap). On the other hand, when the certain reaction area is pressed and bent, the touch panel portions corresponding to a plurality of reaction areas including the pressed reaction area are detected as touch positions (the multi-tap). In the example of FIG. 5, when one reaction area is pressed, the multi-tap is executed with respect to two reaction areas. However, depending on wiring between the electrodes, the multi-tap with respect to three or more reaction areas can be executed, when one reaction area is pressed.

Figure 6A:
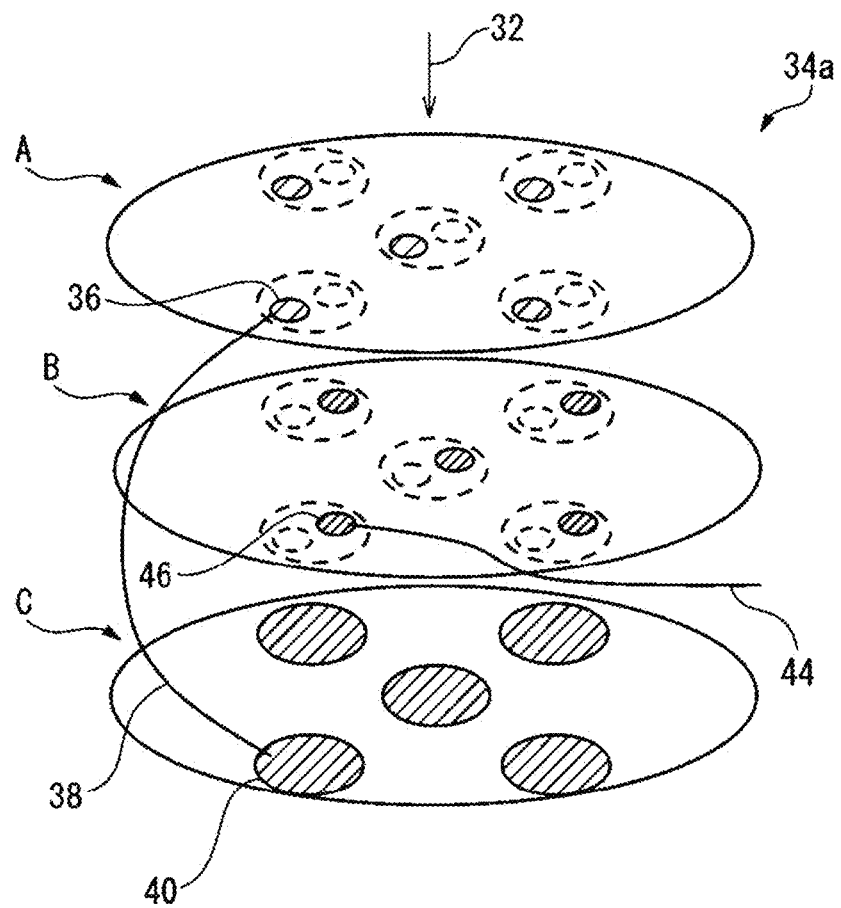
FIG. 6a is a perspective view showing a preferred example of an electrode structure.
Figure 6B:
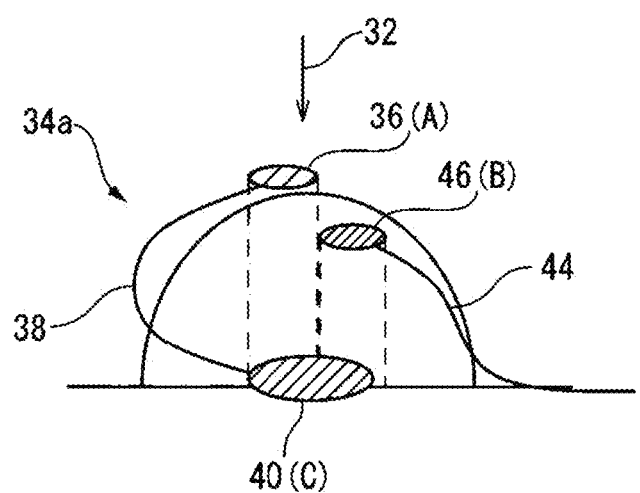
FIG. 6b is a side view showing the preferred example of the electrode structure.

FIGS. 6a and 6b schematically show a preferred example of the electrode structure. FIG. 6a is a perspective view of the A- to C-layers, and FIG. 6b is a side view of the layers. As described above, when the operator merely touches the first electrode (or the A-layer) of the certain reaction area, the operator intends to perform the single-tap. Therefore, it is not preferable that the fourth electrode (or the B-layer) connected to the electrode of the other reaction area be electrically reacted (concretely, the A-layer contact the B-layer, the static electricity of the touch panel surface flow to the A-layer via the B-layer, or the capacitance between the A-layer and the B-layer be changed).

Therefore, as shown in FIGS. 6a and 6b, fourth electrode 46 is configured and positioned so that fourth electrode 46 does not exist in a rear projection area of first electrode 36 with respect to press direction 32. As such, by determining the shapes and the positions of first electrode 36 and fourth electrode 46, first electrode 36 (the A-layer) can be prevented from contacting fourth electrode 46 (the B-layer) even when first electrode 36 is displaced in press direction 32, and further, the distance between first electrode 36 and fourth electrode 46 can be lengthened as possible, and thus it can be avoided that the current flows to the A-layer (the first electrode) via the B-layer (the fourth electrode) (i.e., the misdetection that second reaction area 34b is touched occurs), when the operator touches first electrode 36.

On the other hand, second electrode 40 is configured and positioned so that at least a part of second electrode 40 exists in a lower projection area of fourth electrode 46 (in the drawing, a lower projection area of both first electrode 36 and fourth electrode 46) with respect to press direction 32. As such, by determining the shapes and the positions of second electrode 40 and fourth electrode 46, the B-layer (fourth electrode 46) can assuredly contact the C-layer (second electrode 40) (i.e., the multi-tap can be performed), when first reaction area 34a is pressed.

Figure 7A:
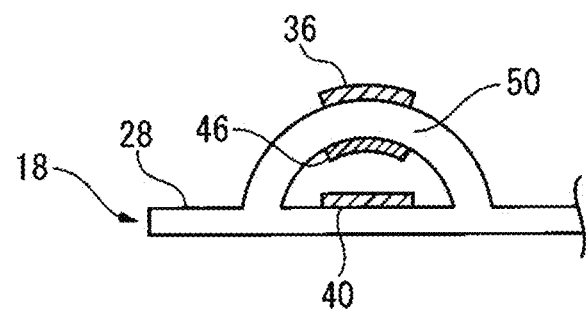
FIG. 7a is a view showing an example of a structure for avoiding an erroneous reaction of the touch panel.
Figure 7B:
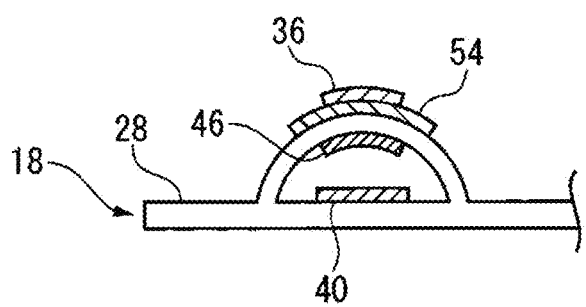
FIG. 7b is a view showing another example of the structure for avoiding an erroneous reaction of the touch panel.

FIGS. 7a and 7b show another example of the structure of the reaction area for avoiding that the fourth electrode (the B-layer) and the other electrode electrically connected to the fourth electrode are reacted when the operator touches the first electrode (the A-layer). In the example of FIG. 7a, first electrode 36 and fourth electrode 46 are arranged on front and back surfaces of a portion (or a convex upper portion) 50 of sheet member 28, respectively, and the thickness (or the distance in the press direction) of portion 50 is larger than the example of FIG. 2, whereby the misdetection when the operator touches first electrode 36 can be avoided.

As shown in FIG. 3, fourth electrode 46 may be separated from the back surface of the convex upper portion so that an air layer 52 is formed between first electrode 36 and fourth electrode 46. By virtue of this, the misdetection when the operator touches first electrode 36 can also be avoided.

Further, as shown in FIG. 7b, between first electrode 36 and fourth electrode 46 (in the drawing, between first electrode 36 and sheet member 28 (or the convex surface)), a spacer (in the drawing, a layer) 54 may be positioned, which is formed by a material such as polyimide, fluorine-based resin or epoxy resin, having a lower dielectric constant than the material forming sheet member 28. By virtue of this, the misdetection when the operator touches first electrode 36 can also be avoided. On the other hand, a high dielectric member used in a conventional capacitor is not preferable, since such a member may transmit the contact of the finger (or the change in electrical charge). As such, at least one of the shape, the size and the material of the article existing between first electrode 36 and fourth electrode 46 may be selected or determined so that fourth electrode 46 is not electrically reacted (concretely, the static electricity of the touch panel surface is not absorbed by the finger, etc., from first electrode 36 via fourth electrode 46, or the electrostatic capacitance between first electrode 36 and fourth electrode 46 is not changed) when an operator contacts the first electrode. By virtue of this, the multi-tap can be prevented from occurring merely when the operator touches first electrode 36.

Figure 8A:
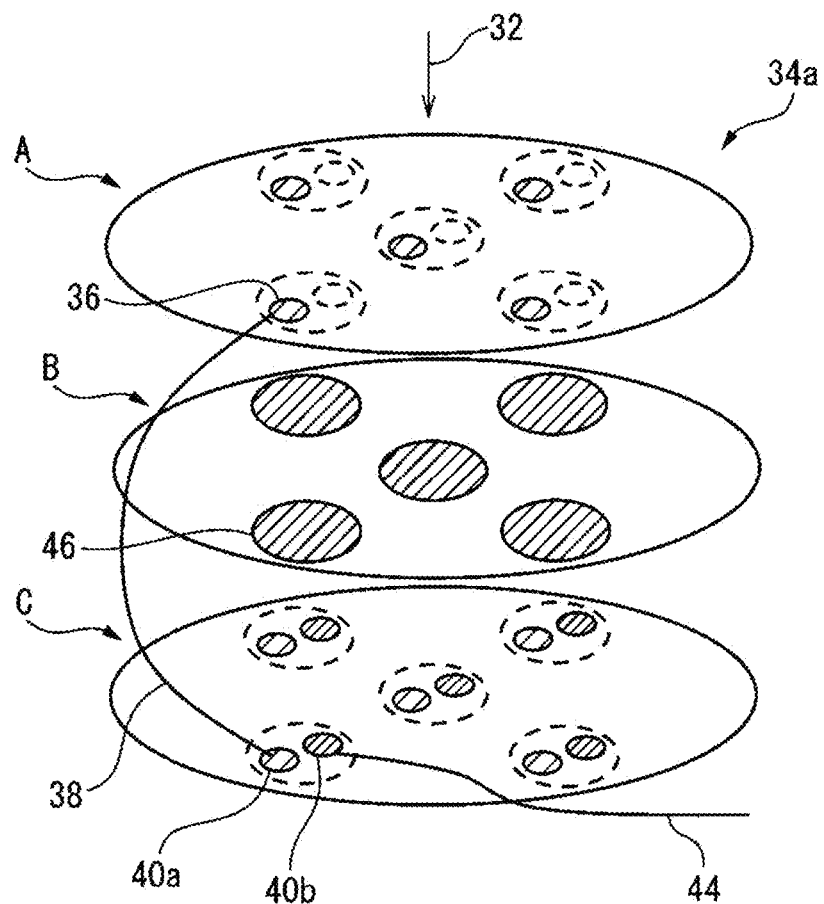
FIG. 8a is a perspective view showing another preferred example of an electrode structure.
Figure 8B:
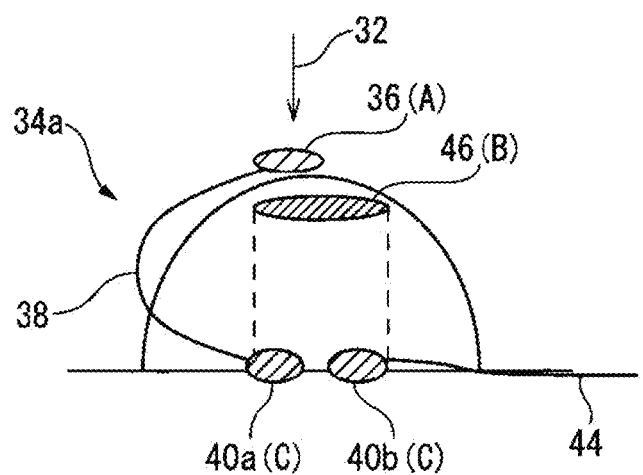
FIG. 8b is a side view showing the other preferred example of the electrode structure.

FIGS. 8a and 8b schematically show another preferred example of the electrode structure. FIG. 8a is a perspective view of the A- to C-layers, and FIG. 8b is a side view of the layers. In this example, second electrode 40 (the C-layer) has a first electrode piece 40a electrically connected to first electrode 36 (the A-layer) by extra-thin wire 38, etc., and a second electrode piece 40b electrically connected the electrode of the other reaction area (e.g., third electrode 42 as shown in FIG. 2) by extra-thin wire 44, etc. Fourth electrode 46 (the B-layer) is configured to electrically connect first electrode piece 40a to second electrode piece 40b when reaction area 34a is pressed and bent in press direction 32.

Concretely, fourth electrode 46 is configured and positioned so that at least a part of fourth electrode 46 exists in a front projection area of both first electrode piece 40a and second electrode piece 40b with respect to press direction 32. As such, by determining the shapes and the positions of second electrode 40 and fourth electrode 46, the B-layer (fourth electrode 46) can contact both first electrode piece 40a and second electrode piece 40b so as to electrically connect the electrode pieces to each other, and thus the multi-tap can be performed, when first reaction area 34a is pressed. In addition, since fourth electrode is not electrically connected to the other electrode, a change in a capacitance relating to fourth electrode 46 (i.e., the multi-tap) does not occur even when the operator touches first electrode 36.

As shown in FIG. 6a or 8a, in order to ensure the transparency of the push button sheet, it is preferable that each layer of one reaction area (in this case, first reaction area 34a) have a plurality of (in the drawing, five) electrodes (or electrode pieces).

Figure 9A:
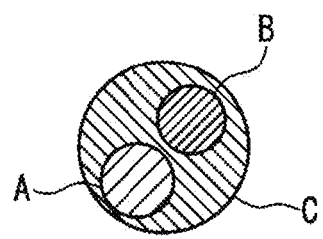
FIG. 9a is a view showing a preferred example of a shape of the electrode in a press direction.
Figure 9B:
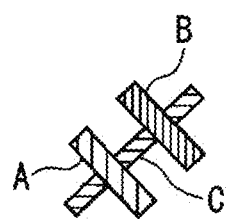
FIG. 9b is a view showing another preferred example of a shape of the electrode in the press direction.
Figure 9C:
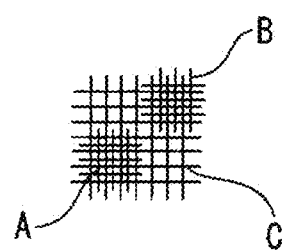
FIG. 9c is a view showing a still another preferred example of a shape of the electrode in a press direction.

FIGS. 9a to 9c show a preferred example of the shape of the electrode, viewed in the press direction of the reaction area. In the example of FIG. 6a (6b), each of the electrodes corresponding to the A-layer, B-layer and C-layer has the circular shape, and the A-layer and B-layer are contained in the C-layer when viewed (from the above) in press direction 32, as shown in FIG. 9a.

However, the electrode structure is not limited to as such. For example, as shown in FIG. 9b, each of the electrodes corresponding to the A-layer, B-layer and C-layer may have a rod shape or a rectangular shape, and the C-layer may be partially overlapped with the A-layer and B-layer when viewed (from the above) in press direction 32.

Alternatively, as shown in FIG. 9c, each of the electrodes corresponding to the A-layer, B-layer and C-layer may have a mesh shape constituted by extra-thin wires, and the C-layer may be partially overlapped with the A-layer and B-layer when viewed (from the above) in press direction 32. As such, each electrode may have any shape and structure as long as the single-tap and the multi-tap as explained above can be realized.

Figure 10:
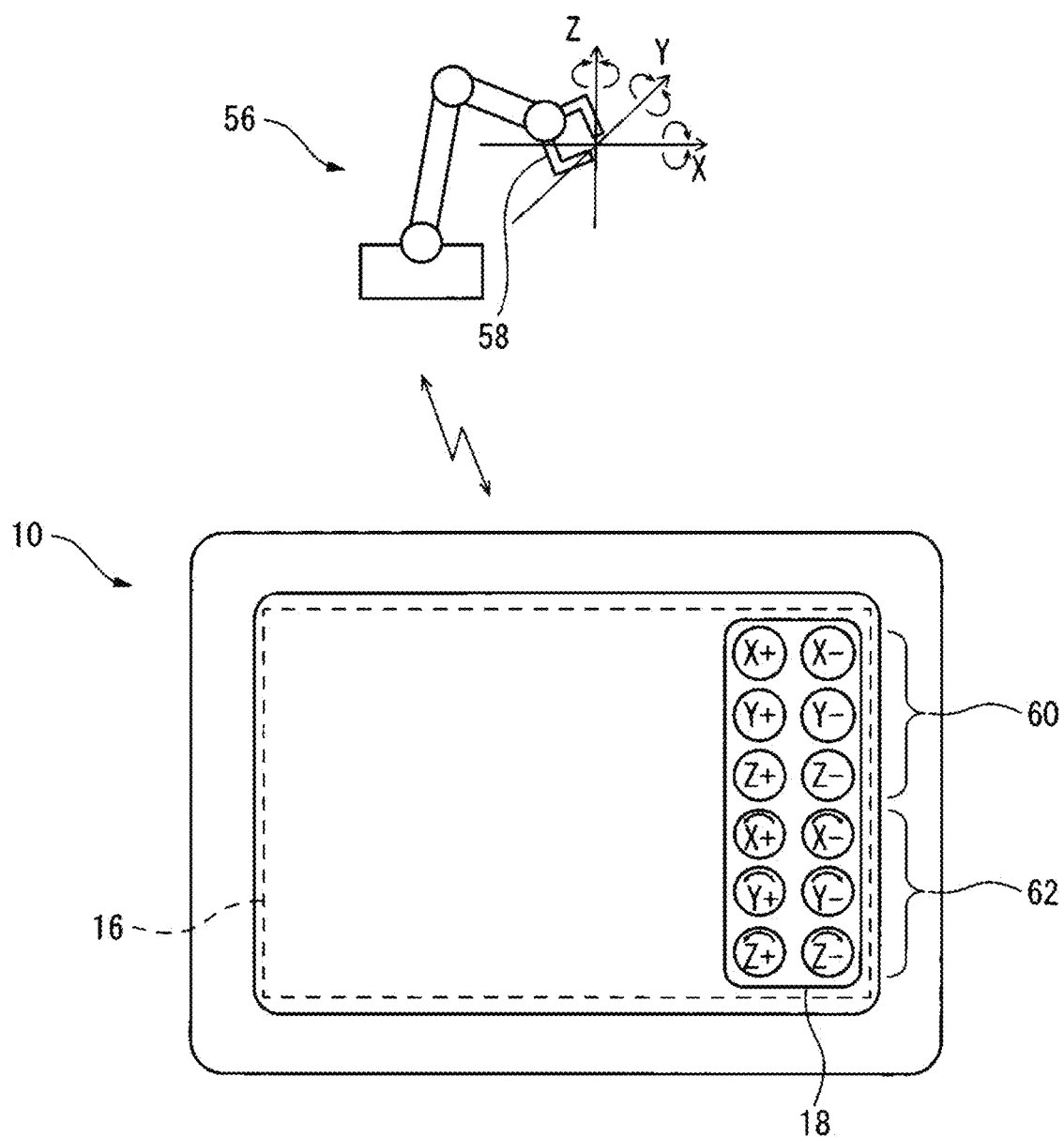
FIG. 10 shows an application example of the touch panel having the push button sheet.

FIG. 10 shows an application example of the touch panel having the push button sheet according to the present disclosure. In this example, mobile terminal 10 such as a tablet, having touch panel 16, is used as a teach pendant for teaching a multi-joint robot 56 via wireless communication, etc. Robot 56 has a movable part 58 such as a hand, configured to move and rotate with respect to three drive axes (X, Y, Z) orthogonal to each other.

Touch panel 16 has six touch buttons (touch switches) 60 (X+, X−, Y+, Y−, Z+, Z−) for translating movable part 58 along the X−, Y− and Z-axes of robot 56, and six touch buttons (touch switches) 62 (X+, X−, Y+, Y−, Z+, Z− to which an arc is added) for rotating movable part 58 about the X−, Y− and Z-axes of robot 56. When push button sheet 18 having twelve reaction areas (the hollow convex portions) is applied to touch panel 16, each of touch buttons 60 and touch buttons 62 functions as the push button capable of realizing the single-tap and the multi-tap.

For example, when the operator comes into contact with the X-button while searching the position of the X-button only by feel of the fingertip, movable part 58 of robot 56 does not move. Otherwise, for example, when the operator presses down the X+ button, movable part 58 can be translated only in the + direction along the X-axis. As such, the misdetection by the operator when the operator accidentally touches the reaction area. Also, even when mobile terminal 10 is used for a purpose (e.g., editing a browser or a text) other than the teach pendant, the mobile terminal can be used while push button sheet 18 is applied to touch panel 16. For example, when a link of the browser displayed on reaction area 34a is single-tapped so that reaction area 34a is not pressed, the operation similar to when push button sheet 18 is not applied can be performed. In other words, when the tablet is not used as the teach pendant, the effort of removing the push button sheet from the tablet can be saved.

As described above, by using push button sheet 18 of the present disclosure in touch panel 16, the different input results can be obtained, between when the operator touches the button and when the operator presses the same button whereby the various inputs can be carried out in comparison to the prior art. Further, by appropriately selecting the material of push button sheet 18 (sheet member 28), the sheet can be easily attached to or detached from touch panel 16. Therefore, even when touch panel 16 is a commercialized product, the convenient touch panel can be provided depending on the intended use thereof.

According to the present disclosure, the different input results can be obtained, between when the operator touches the reaction area of the push button sheet and when the operator presses the same reaction area, whereby the various input results can be obtained even when the number of the reaction areas is relatively small. Also, depending on settings of the touch panel, an erroneous operation, which may occur when the operator accidentally touches the reaction area, can be avoided.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A push button sheet, comprising:
    a convex reaction area configured to be bent in a predetermined press direction;
    a first electrode arranged on a convex surface of the convex reaction area;
    a second electrode arranged in the convex reaction area below the first electrode with respect to the press direction, and electrically connected to the first electrode;
    a third electrode arranged on a portion of the push button sheet other than the convex reaction area; and
    a fourth electrode arranged between the first electrode and the second electrode,
    wherein the second electrode and the third electrode are configured to be electrically communicated with each other through the fourth electrode when the convex reaction area is bent in the press direction, and
    the first electrode and the fourth electrode are electrically isolated from each other when the convex reaction area is not bent.

2. The push button sheet of claim 1, wherein the fourth electrode is electrically connected to the third electrode, and configured to come into contact with the second electrode when the convex reaction area is bent in the press direction.

3. The push button sheet of claim 2, wherein the fourth electrode is positioned so that the fourth electrode is not included in a lower projection area of the first electrode with respect to the press direction.

4. The push button sheet of claim 2, further comprising an article existing between the first electrode and the fourth electrode, wherein
    the article has at least one of a predetermined shape, size, and material so that an electrostatic capacitance between the first electrode and the fourth electrode is not changed when an operator contacts the first electrode.

5. The push button sheet of claim 2, wherein the first electrode is formed on an outer surface of a convex portion of a sheet material which constitutes a hollow convex part defining the convex reaction area, and the fourth electrode is formed on an inner surface of the convex portion.

6. The push button sheet of claim 1, wherein
    the second electrode has
        a first electrode piece electrically connected to the first electrode, and a second electrode piece electrically connected to the third electrode and not electrically connected to the first electrode, and the fourth electrode is configured to electrically connect the first electrode piece to the second electrode piece when the convex reaction area is bent in the press direction.

7. A touch panel comprising the push button sheet of claim 1.

8. The push button sheet of claim 1, wherein the second electrode is configured to electrically react in response to a contact on the first electrode without bending the convex reaction area.

* * * * *